United States Patent [19]

Dewey

[11] Patent Number: 4,552,441
[45] Date of Patent: Nov. 12, 1985

[54] COLOR DISPLAY FROM A SINGLE LIGHT VALVE

[75] Inventor: Anthony G. Dewey, San Jose, Calif.

[73] Assignee: International Business Machines Corporation, Armonk, N.Y.

[21] Appl. No.: 625,926

[22] Filed: Jun. 29, 1984

[51] Int. Cl.$^4$ .............................................. G03B 21/28
[52] U.S. Cl. ...................................... 353/31; 353/99; 353/94
[58] Field of Search ...................... 353/30, 31, 98, 99, 353/94

[56] References Cited

U.S. PATENT DOCUMENTS 3,922,080 11/1975 Kodama et al. .................. 353/31 X
4,150,396 4/1979 Hareng et al. .
4,345,258 8/1982 Tsai et al. .

FOREIGN PATENT DOCUMENTS 376977 6/1923 Fed. Rep. of Germany ........ 353/31
317219 4/1934 Italy ...................................... 353/30

OTHER PUBLICATIONS

IBM Technical Disclosure Bulletin, vol. 21, No. 3, Aug. 1978, A. G. Dewey, "Image Overlay with Single Projection Lens."

Primary Examiner—Harry N. Haroian
Attorney, Agent, or Firm—Joseph E. Kieninger

[57] ABSTRACT

A color display is produced by overlaying two images from a single light valve. Filters are used to select the two primary colors used in the display. The two projection beams are folded and merged onto a dichroic mirror where they combine so that they follow an identical path to the screen. The dichroic mirror is positioned so that the two projection beams are equivalent when they strike the dichroic mirror. The dichroic mirror is an interference filter which reflects the spectral band passed by the first filter over a range of incident angles and transmits the spectral band passed by the second filter over the same range of angles.

4 Claims, 3 Drawing Figures

COLOR DISPLAY FROM A SINGLE LIGHT VALVE

TECHNICAL FIELD

This invention relates to display and more particularly to a color display produced by overlaying two images from a single light valve.

BACKGROUND ART

A color display may be obtained by the appropriate overlay of two or more light valve images. It is preferred, however, to employ an optical system in which multiple images are formed on a single light valve and to overlay the images with a single projection lens. This technique facilitates the focusing and alignment of the images. Such an optical system is described by Dewey in the IBM Technical Disclosure Bulletin Vol 21, No. 3 August 1978, pages 1201 and 1202. This system uses an off axis projection in which light of one color, for example, red, is produced by a condenser system and the projection light of a different color, for example, green, is provided by a second condenser system. The two images are coprojected by a lens onto the screen with the use of parallel pairs of folding mirrors.

There are two major problems with this optical system, both of which are solved by the present invention. The first problem relates to the distortion of the projection lens. FIG. 1 shows the field of view of the projection lens along with the position of two images 20A and 20B written on the light valve that are overlaid by the projection system. The optical system attempts to overlay the following pairs of points: (1,2′), (2,1′), (3,4′) and (4,3′). However, distortion in the projection lens prevents these points from being overlaid exactly and the result is misconvergence of the two images. Consequently it would be necessary to employ an expensive projection lens having very low distortion in order to achieve adequate color convergence in the display.

The second problem is that because of the off-axis projection system, the two colored beams converge onto the projection screen at equal but opposite angles. All projection screens are directional to some extent and rear-projection screens are strongly directional. That is, they are not perfect diffusers and the brightness of a given point on the screen depends on the position of the viewer. Thus, when two colored beams are incident at different angles onto the screen, the resultant color of a point on the screen depends on the position of the viewer. For example, with red and green beams incident on the screen, a point will appear yellow from one position, but may appear orange from another viewpoint and yellow-green from yet another. Moreover, from a fixed viewpoint, different points of the screen will have different colors. The result is a display that has non-uniform color and in which the color changes as the viewer moves. Such a system is not desirable. Front projection screens may be made with very little directionality and in this case the color uniformity may be adequate. However, such screens are usually used for group viewing with long projection distances, and hence the final two folding mirrors which direct the two colored beams onto the screen would have to be widely separated. This would be impractical for general use. This type of optical system applies to either a reflective light valve or a transmissive light valve.

The patent to Hareng et al, U.S. Pat. No. 4,150,396, describes two embodiments of a projection system that creates a color display from a transmissive, laser-addressed liquid crystal light valve (or valves). As in the present invention, both systems employ a single projection lens, however, they may only be used with transmissive light-valves. Moreover, the first embodiment is impractical in that the optical path length is different for the three colored images. Thus, it is impossible to focus all three on a single screen and overlay the images. In the second embodiment, which employs three light valves, the path length is the same for all three images, but the system can only be used with a projection lens having a very narrow field of view. This implies a long projection distance to achieve a screen image of adequate size.

The patent to Kidwell and Tsai, U.S. Pat. No. 4,345,258, describes a color display system in which a pair of transmissive laser-addressed liquid crystal light valves are co-projected onto a screen using a single projection lens and a dichroic mirror. This system does not use a single light valve for the two images, and is not applicable to a reflective light valve.

SUMMARY OF THE INVENTION

It is a primary object of this invention to provide an improved color display.

It is another object of this invention to provide a color display from a single light valve.

It is still another object of this invention to provide a color display suitable for use with either a reflective light valve or a transmissive light valve.

These and other objects are accomplished with the color display that is produced by overlaying two images from a single light valve. Filters are used to select the two primary colors used in the display. The two projection beams are folded and merged onto a dichroic mirror where they combine so that they follow an identical path to the screen. The dichroic mirror is positioned so that the two projection beams are equivalent when they strike the dichroic mirror. The dichroic mirror is an interference filter which reflects the spectral band passed by the first filter over a range of incident angles and transmits the spectral band passed by the second filter over the same range of angles. The images are written on the light valve by one of a number of ways that are known in the art. An example is a laser-addressed liquid crystal light valve, in which a smectic liquid crystal cell is thermally written by a scanned laser beam.

Other objects of this invention will be apparent from the following detailed description, reference being made to the following drawings in which a specific embodiment of the invention is shown.

DESCRIPTION OF THE PREFERRED EMBODIMENT

Figure 1:
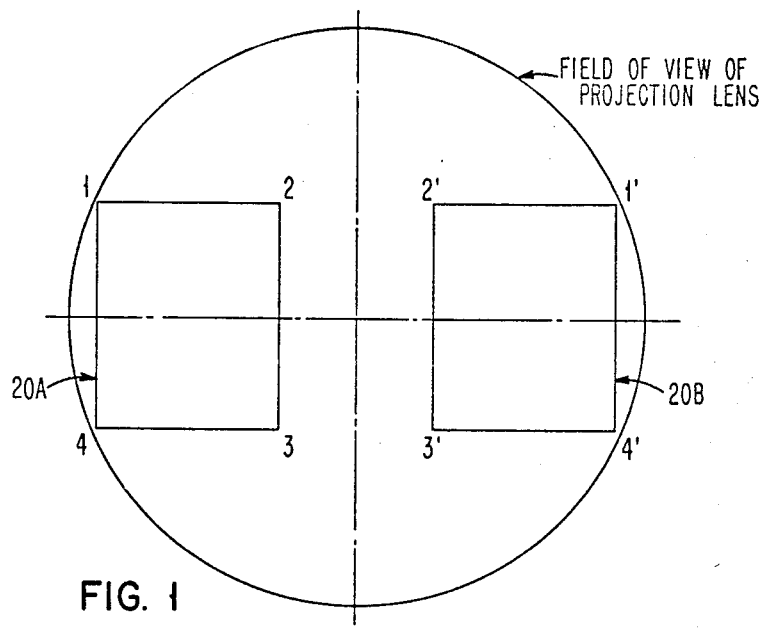
FIG. 1 illustrates the field of view of the projection lens along with the images written on the light valve that are overlaid by the projection system.
Figure 2:
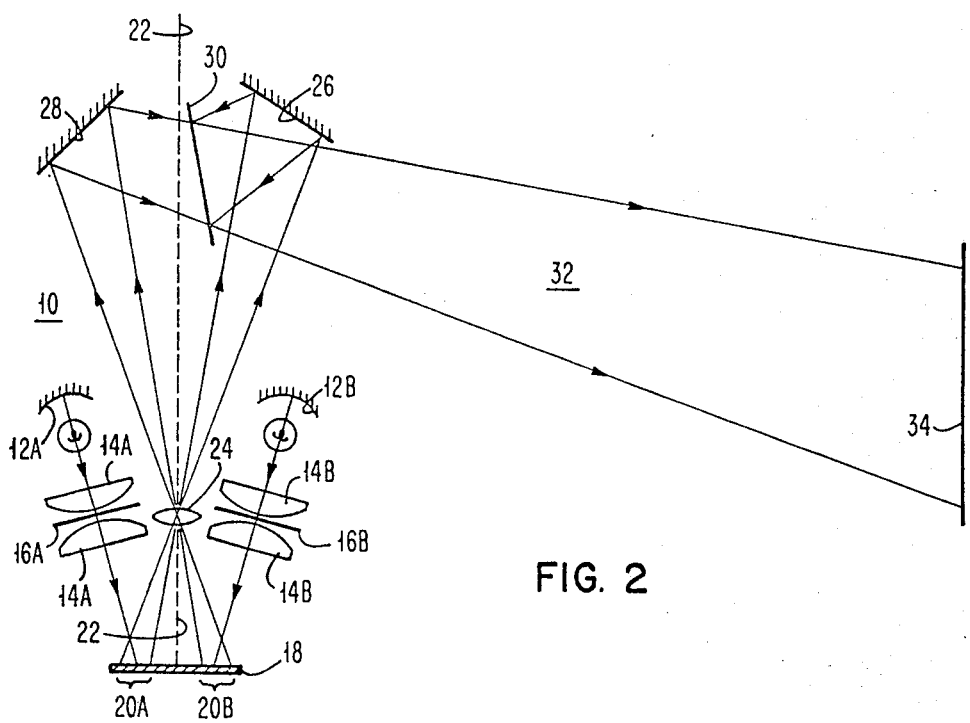
FIG. 2 is a schematic view of a color display made in accordance with this invention.

As shown in FIG. 2, the color display 10 includes two lamps 12A and 12B that provide light which is collected by condenser lenses 14A and 14B respectively. Filter 16A is positioned between the condenser lenses 14A and selects one primary color from the light coming from lamp 12A. Filter 16B is positioned between condenser lenses 14B and is used to select a second primary color from the light from lamp source 12B. The two illumination beams are directed onto a reflective light valve 18 which reflects the beams into the aperture of the projection lens 24. The light valve has two images 20A and 20B, one on either side of the axis 22 of the projection lens 24. The position of these images within the field of view of the projection lens is shown in FIG. 1.

The beam reflected by image 20A is projected onto plane mirror 26 and reflected onto dichroic mirror 30 which reflects the beam onto the screen 34. The beam reflected by image 20B is projected onto plane mirror 28 and reflected onto dichroic mirror 30 which transmits the beam to the screen 34. By appropriate positioning of mirrors 26, 28 and 30 it is possible to ensure: (a) that the optical path length from the projection lens to mirror 30 is identical for both beams; (b) that the two beams are incident on opposite sides of mirror 30 at equal angles; and (c) that the combined beam 32 does not strike mirror 26 but proceeds to the screen 34. The three mirrors 26, 28 and 30 are not placed arbitrarily. There is only a narrow range of positions that satisfy the above requirements, particularly if the screen is required to be at a prescribed angle to the plane of the light valve 18.

With the mirrors positioned appropriately, the two images 20A and 20B are combined on the screen 34 to produce a color display. Referring to FIG. 1, this optical system combines the two images in such a way that the following pairs of points are overlaid (1,1'), (2,2'), (3,3') and (4,4'). That is, the overlay is symmetrical with respect to the center of the field of view of the projection lens. Even if this lens has considerable distortion, this distortion will be symmetrical about the lens axis and hence the two images may be overlaid with perfect color convergence even though they are distorted. This allows the use of a relatively inexpensive projection lens in this color display system.

The dichroic mirror 30 is an interference filter that reflects the spectral band passed by filter 16A over the range of incidence angles shown in FIG. 2, and transmits the spectral band passed by filter 16B over the same range of incidence angles. The transmittance of the dichroic mirror at a given wavelength is dependent on the angle of incidence of the beam, and hence, the spectrum of light passed by filters 16A and 16B must be chosen carefully to achieve uniform color on the display screen.

Figure 3:
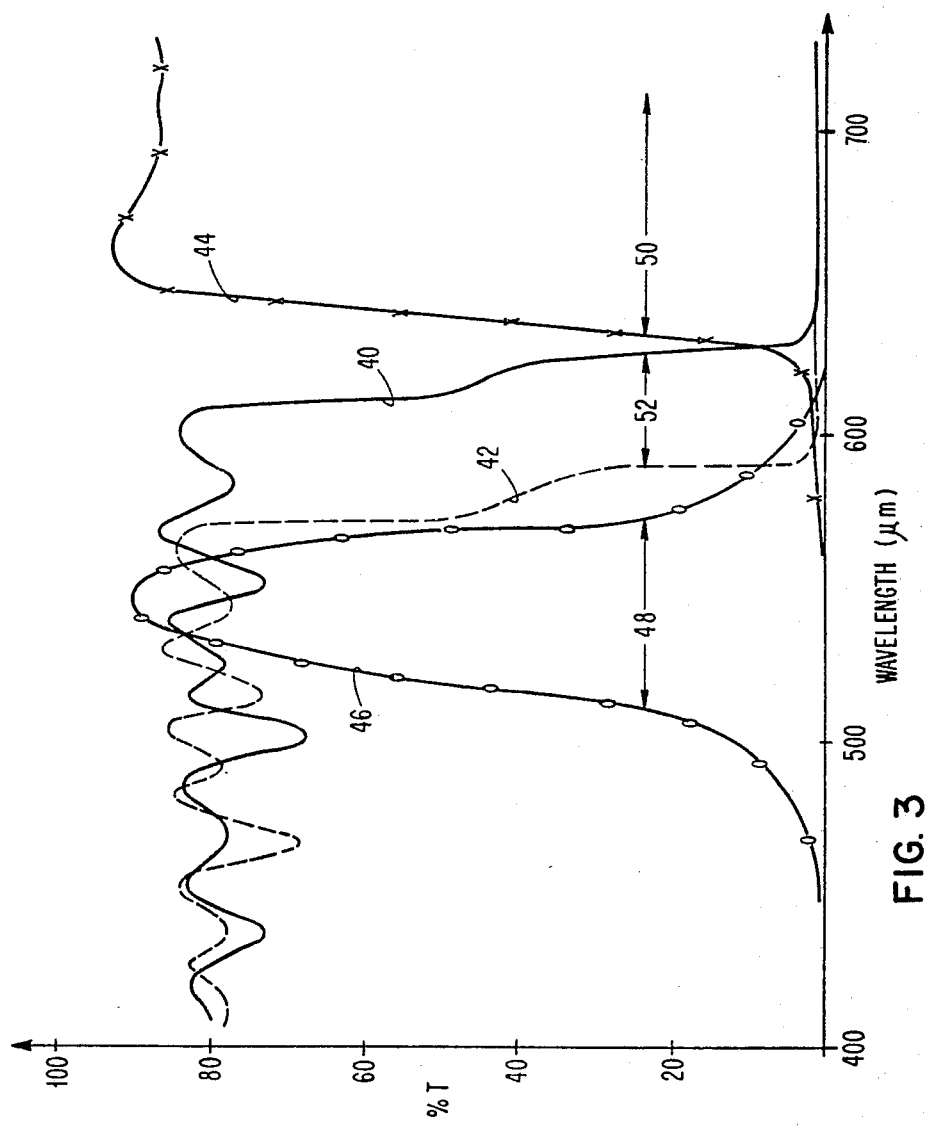
FIG. 3 illustrates the characteristics of the dichroic mirror at the minimum and maximum angles of incidence of the beam.

FIG. 3 shows the characteristic of the dichroic mirror at the minimum 40 and maximum 42 angles of the incidence of the beam along with the characteristic 44 of filter 16A and the characteristic 46 of filter 16B. The passbands 48 and 50 of the two filters must be outside of the transition range 52 of the dichroic mirror. Thus, a display with a narrow projection angle and hence a narrow range of incidence angles on the dichroic mirror, will allow broader spectra 48,50 for the color filters.

Many alternate configurations are possible within the scope of this invention. The angle between the plane of the light valve 18 and that of the screen 34 is determined by the position and angles of the three mirrors 26, 28 and 30. In the example shown, the screen is perpendicular to the plane of the light valve. In alternate configurations with one or more additional plane mirrors positioned either before or after the dichroic mirror, the screen may be placed parallel to the light valve or at any other desired angle.

Whereas the example in FIG. 2 shows the use of two separate light sources, it would be possible to use a single source with an appropriate collimating lens, dichroic beam splitter and folding mirrors to create the two colored illumination beams.

Although preferred embodiments have been described, it is understood that numerous variations may be made in accordance with the principles of this invention.

I claim:
1. A color display comprising
   a projection screen,
   means for producing light of a first color for an image,
   means for producing light of a second color for an image,
   a light valve having a first color image positioned on a first side of the axis of a projection lens and a second color image positioned on the second side of said axis,
   a first mirror adapted to fold the beam from said first color image,
   a second mirror adapted to fold the beam from said second color image, and
   a dichroic mirror adapted to transmit the spectral band reflected from said first mirror onto a preselected location on said screen and adapted to reflect the spectral band from said second mirror onto said preselected position on said screen, said dichroic mirror positioned so that the optical path lengths for the beams from said first and second color images to said dichroic mirror are equal, and the angles of incidence of said beams on said dichroic mirror are equal.

2. A display as described in claim 1 wherein said light valve is a transmissive light valve.

3. A display as described in claim 1 wherein said light valve is a reflective light valve.

4. A display as described in claim 1 wherein said light valve is a laser-addressed liquid crystal light valve.

* * * * *